US009133823B2

(12) United States Patent
Jaw et al.

(10) Patent No.: US 9,133,823 B2
(45) Date of Patent: Sep. 15, 2015

(54) VERTICAL AXIS WIND TURBINE

(71) Applicant: NATIONAL TAIWAN OCEAN UNIVERSITY, Keelung (TW)

(72) Inventors: Shenq-Yuh Jaw, Keelung (TW); Jiahn-Horng Chen, Keelung (TW); Ching-Yeh Hsin, Taipei (TW)

(73) Assignee: NATIONAL TIAWAN OCEAN UNIVERSITY, Keelung (TW)

( * ) Notice: Subject to any disclaimer, the term of this patent is extended or adjusted under 35 U.S.C. 154(b) by 60 days.

(21) Appl. No.: 14/064,287

(22) Filed: Oct. 28, 2013

(65) Prior Publication Data

US 2015/0001850 A1 Jan. 1, 2015

(30) Foreign Application Priority Data

Jun. 28, 2013 (TW) .............................. 102123297 A

(51) Int. Cl.
*F03D 9/00* (2006.01)
*H02P 9/04* (2006.01)
*F03D 3/06* (2006.01)

(52) U.S. Cl.
CPC ............ *F03D 3/067* (2013.01); *F05B 2260/75* (2013.01)

(58) Field of Classification Search
CPC ........... F05B 2240/23; F05B 2240/218; F05B 2240/21; F05B 2240/211; F05B 2240/9121; F05B 2240/913; F05B 2260/901; F05B 2270/321; F05B 2220/706; F05B 2240/232; F05B 2240/231; F05B 2240/90; F05B 2270/1032; F05B 2240/2212; F05B 2240/11; Y02E 10/74; Y02E 10/70; Y02B 10/30; H02K 7/183; B63B 2209/20

USPC ............ 290/55, 44; 416/132 B, 117; 415/4.2, 415/208.1, 4.4, 4.3
See application file for complete search history.

(56) References Cited

U.S. PATENT DOCUMENTS

| 4,105,363 | A | * | 8/1978 | Loth | ............................... | 416/41 |
| 4,180,372 | A | * | 12/1979 | Lippert, Jr. | ..................... | 416/23 |
| 4,274,809 | A | * | 6/1981 | Delgado et al. | ............... | 416/117 |
| 4,334,823 | A | * | 6/1982 | Sharp | ............................ | 416/119 |
| 4,368,392 | A | * | 1/1983 | Drees | .............................. | 290/54 |
| 4,456,429 | A | * | 6/1984 | Kelland | ........................ | 416/117 |
| 6,320,273 | B1 | * | 11/2001 | Nemec | ............................ | 290/55 |
| 7,425,776 | B2 | * | 9/2008 | Ketcham | ........................ | 290/55 |

(Continued)

FOREIGN PATENT DOCUMENTS

GB 2202592 A * 9/1988
WO WO2013114401 A2 * 8/2013

*Primary Examiner* — Julio Gonzalez
*Assistant Examiner* — Charles Reid, Jr.
(74) *Attorney, Agent, or Firm* — WPAT, P.C.; Justin King

(57) ABSTRACT

A vertical axis wind turbine includes a support axis and a wind wheel. The wind wheel includes a rotation base, plural rotation stand sets, plural deflection structures, plural blades, and plural deflection-limiting structures corresponding to the plural blades. The rotation base is rotatably disposed on the support axis. The plural rotation stand sets may define a rotation plane. A first end of each rotation stand set is fixedly disposed on the rotation base. Each blade is pivotally coupled to a second end of the corresponding rotation stand set through the corresponding deflection structure. Consequently, an angle of attack of the blade in an airflow is correspondingly adjusted. When one of the plural blades is deflected, the corresponding deflection-limiting structure generates a first rotational torque in a first rotating direction or a second rotational torque in a second rotating direction so as to rotate the rotation base.

13 Claims, 7 Drawing Sheets

(56) References Cited

U.S. PATENT DOCUMENTS

| | | | | |
|---|---|---|---|---|
| 7,508,089 B2* | 3/2009 | Guang et al. | | 290/44 |
| 7,816,801 B2* | 10/2010 | Guang et al. | | 290/55 |
| 7,891,939 B1* | 2/2011 | Zuteck | | 415/4.3 |
| 8,030,792 B2* | 10/2011 | Haar | | 290/44 |
| 8,038,383 B2* | 10/2011 | Sharpe | | 415/4.2 |
| 8,061,964 B2* | 11/2011 | Zuteck | | 415/4.3 |
| 8,297,911 B2* | 10/2012 | Onofri et al. | | 415/4.2 |
| 8,410,627 B2* | 4/2013 | Cowap | | 290/55 |
| 8,450,872 B2* | 5/2013 | Huang et al. | | 290/55 |
| 8,497,592 B1* | 7/2013 | Jones | | 290/44 |
| 8,529,190 B2* | 9/2013 | Naumenko | | 415/4.2 |
| 8,648,483 B2* | 2/2014 | Haar | | 290/44 |
| 8,894,348 B2* | 11/2014 | Thacker, II | | 415/4.4 |
| 2002/0105190 A1* | 8/2002 | Thomas | | 290/55 |
| 2007/0297903 A1* | 12/2007 | Morris | | 416/132 A |
| 2008/0217925 A1* | 9/2008 | Boone et al. | | 290/55 |
| 2008/0309090 A1* | 12/2008 | Stern et al. | | 290/55 |
| 2009/0140528 A1* | 6/2009 | Ireland | | 290/55 |
| 2009/0224606 A1* | 9/2009 | Gandy | | 307/69 |
| 2010/0054936 A1* | 3/2010 | Sneeringer | | 416/1 |
| 2010/0084863 A1* | 4/2010 | Potter | | 290/44 |
| 2010/0096854 A1* | 4/2010 | Paluszek et al. | | 290/44 |
| 2010/0233919 A1* | 9/2010 | Ersoy | | 440/8 |
| 2010/0295316 A1* | 11/2010 | Grassman | | 290/55 |
| 2011/0133474 A1* | 6/2011 | Haar | | 290/55 |
| 2012/0049534 A1* | 3/2012 | Kikuchi | | 290/55 |
| 2012/0082562 A1* | 4/2012 | Kotler | | 416/93 R |
| 2012/0091715 A1* | 4/2012 | Ozkul | | 290/44 |
| 2012/0211992 A1* | 8/2012 | Boone | | 290/55 |
| 2013/0108458 A1* | 5/2013 | Goldstein | | 416/240 |
| 2013/0119672 A1* | 5/2013 | Boone | | 290/55 |

* cited by examiner

VERTICAL AXIS WIND TURBINE

FIELD OF THE INVENTION

The present invention relates to a vertical axis wind turbine, and more particularly to a vertical axis wind turbine capable of withstanding the pressure or tension that is caused by the lift force upon rotation of the blade to different azimuth angles and capable of transforming the pressure or tension into rotational torque, thereby effectively reducing or eliminating the possibility of damaging a support axis (i.e. a central axis) and enhancing the rotating efficiency and the power generation efficiency.

BACKGROUND OF THE INVENTION

With increasing environmental consciousness, there are growing demands on clean energy, natural energy or renewable energy. For example, solar energy, wind power, water power, marine energy and tide energy are the well-known power sources of the clean energy, natural energy or renewable energy. As known, wind power is generated by using airflow (e.g. wind) to driving rotation of a wind wheel of a wind turbine and using a primary generator of the wind turbine to convert the rotating kinetic energy into electric power. Generally, the wind wheel comprises plural blades or airfoils.

Generally, the wind turbines are classified into two types, i.e. a horizontal axis wind turbine and a vertical axis wind turbine. During operations of the horizontal axis wind turbine, the central axis of the wind wheel is in parallel with the ground or the direction of the airflow. During operations of the vertical axis wind turbine, the central axis of the wind wheel is perpendicular to the ground or the direction of the airflow. As the direction of the airflow changes, for allowing the wind wheel to be rotated with the airflow, the orientation of the wind wheel of the horizontal axis wind turbine should be correspondingly changed. However, in response to the airflow in any direction, the wind wheel of the vertical axis wind turbine can be rotated. That is, even if the direction of the airflow changes, it is not necessary to adjust the orientation of the central axis of the wind wheel.

FIG. 1 is a schematic perspective view illustrating a conventional vertical axis wind turbine. As shown in FIG. 1, the vertical axis wind turbine 100 principally comprises a support axis 11, a primary generator 12, plural fixing props 13, and plural blades 14 corresponding to the fixing props 13. For clarification, three blades 14 are shown in the drawing. The plural blades 14 are fixedly disposed on the corresponding fixing props 13. Consequently, the blades 14 and the fixing props 13 are collaboratively constituted as a wind wheel. The wind wheel is rotatably disposed on the support axis 11. Upon rotation of the wind wheel, the support axis 11 is used as a central axis. Moreover, the support axis 11 is used for supporting the primary generator 12. The primary generator 12 may be disposed within the support axis 11, or located over or under the support axis 11. Consequently, the support axis 11 (i.e. the central axis of the wind wheel) is perpendicular to the ground or the direction of the airflow. As shown in FIG. 1, the direction of the airflow is denoted by the direction of an ambient wind speed v. Moreover, upon rotation of the wind wheel, the primary generator 12 is driven to generate electric power.

Generally, as shown in FIG. 1, the cross section of the blade 14 of the vertical axis wind turbine 100 has an airfoil configuration. According to the aerodynamic principle, the airflow around the airfoil may create a lift force. In response to lift force, a rotational torque is generated to rotate the wind wheel. Moreover, for achieving the both functions of generating a large rotational torque and supporting the weight of the blade 14 during operation of the wind wheel, the connecting point (i.e. the fulcrum P1) between the fixing prop 13 and the corresponding blade 14 is separated from a leading edge of the blade 14 by a specified distance. For example, the fulcrum P1 is separated from the leading edge of the blade 14 by one third or one fourth of a chord length.

The wind turbine 100 as shown in FIG. 1 is a wind turbine with vertical type (H-type) blades. It is noted that the shapes of the blades of the vertical axis wind turbine are not restricted. For example, the blades of other vertical axis wind turbines may have symmetric shapes, arc shapes, curvy shapes, helical shapes or other special shapes.

FIGS. 2A and 2B schematically illustrate two-dimensional expression of associated forces exerted on the blade of the vertical axis wind turbine of FIG. 1. As shown in FIG. 2A, a relative wind speed w is a wind speed relative to the blade 14 in the ambient wind speed v. An angle between the relative wind speed w and a chord line c of the blade 14 (i.e. the line passing through the leading edge and the trailing edge of the blade) is referred as an angle of attack ($\alpha$).

According to aerodynamics, the magnitude of the angle of attack ($\alpha$) is related to the magnitude of the lift force that is caused by the airflow and exerted on the blade 14. In case that the direction and speed of the ambient wind speed v is constant and the blade 14 is fixedly disposed on the corresponding prop 13, the direction of relative wind speed w on the blade 14 is unceasingly changed as the blade 14 is rotated. Consequently, during rotation of the blade 14, the magnitude of the angle of attack ($\alpha$) is correspondingly changed. That is, as the blade 14 is rotated one turn, the azimuth angle varies from 0 to 360 degrees, and the lift forces corresponding to different angles of attack ($\alpha$) are different. Consequently, the rotational torques for rotating the blade 14 about the vertical axis and corresponding to different azimuth angles will be different. In other words, it is impossible to control and maintain the optimal angle of attack to acquire the optimal lift force. For example, if the angle of attack is too large, the drag coefficient of the oncoming airflow will increase and lift coefficient of the oncoming airflow will decrease.

Moreover, the blade 14 is fixedly disposed on the corresponding prop 13, and the fulcrum P1 between the fixing prop 13 and the corresponding blade 14 is not located at the leading edge of the blade 14. Upon rotation of the tip of the fixing prop 13, the fulcrum P1 between the fixing prop 13 and the corresponding blade 14 is moved along a circular path (i.e. in a circular motion). That is, during the practical rotation, the leading edge of the blade 14 is not rotated along the tangential direction of the circular trajectory of the fulcrum P1. In particular, the leading edge of the blade 14 is rotated at a pitch angle $\gamma$ (also referred as an angle of pitch).

As shown in FIG. 2A, the pitch angle $\gamma$ is the angle between the moving direction m of the blade 14 (especially the leading edge of the blade 14) and the chord line c of the blade 14. The direction of the chord line c is in parallel with the tangential direction of the circular trajectory of the fulcrum P1. Under this circumstance, the magnitude of the lift force generated by the airflow around the blade 14 is dependent on the angle of attack ($\alpha$). In addition, the positive or negative effect caused by the magnitude of the pitch angle $\gamma$ may directly influence the change of the angle of attack ($\alpha$) during rotation. On the other hand, if the fulcrum P1 between the fixing prop 13 and the corresponding blade 14 is changed, the pitch angle $\gamma$ is correspondingly changed, and the angle of attack ($\alpha$) is correspondingly influenced. Since the generated rotational torque is different, the rotating efficiency is different.

Moreover, as shown in FIG. 2B, the ambient wind speed v is the prevailing wind speed (i.e. in the direction of the airflow) in the ambient wind field. In FIG. 2B, the forces exerted on the blade 14 at the positions corresponding to two azimuth angles are shown. Generally, the azimuth angles from 0 to 180 degrees correspond to a windward side, and the azimuth angles from 180 to 360 degrees correspond to a leeward side. At the azimuth angle of 90 degrees, a lift force L1 caused by the relative wind speed w is exerted on the blade 14. The lift force L1 is perpendicular to the relative wind speed w. The lift force L1 may be resolved into two components. One component L1n is projected along the normal direction of the rotation plane, and the other component L1t is projected along the tangential direction of the rotation plane. Similarly, at the azimuth angle of 270 degrees, a lift force L2 caused by the relative wind speed w is exerted on the blade 14. The lift force L2 may be resolved into two components L2n and L2t. For clarification and brevity, the drag force (in parallel with the relative wind speed w) caused by the airflow and exerted on the blade 14 is not shown.

From the above discussions, each of the components L1t and L2t may exert a thrust force on the blade 14, thereby generating a rotational torque of rotating the blade 14. The component L1n at the windward side may exert a pressure on the support axis 11 (i.e. the central axis). The component L2n at the leeward side may exert a tension on the support axis 11. Since the direction of the pressure (i.e. the normal direction of the blade 14 toward the support axis 11) and the direction of the tension (i.e. the normal direction of the blade 14 away from the support axis 11) are the same as the direction of the ambient wind speed v (i.e. the direction of the airflow), the support axis 11 is pushed and pulled by the pressure and the tension, respectively. In other words, the support axis 11 is readily damaged.

SUMMARY OF THE INVENTION

The present invention provides a vertical axis wind turbine. The vertical axis wind turbine is capable of withstanding the pressure or the tension that is caused by the lift force upon rotation of the blade to different azimuth angles and capable of transforming the pressure or the tension into rotational torque. Consequently, the rotating efficiency and the power generation efficiency are both enhanced. Moreover, the possibility of damaging a support axis (i.e. a central axis) can be effectively reduced or eliminated.

In accordance with an aspect of the present invention, there is provided a vertical axis wind turbine. The vertical axis wind turbine includes a support axis, a primary generator, and a wind wheel. The wind wheel includes a rotation base, plural rotation stand sets, plural deflection structures and plural blades corresponding to the plural rotation stand sets, and plural deflection-limiting structures corresponding to the plural blades. The rotation base is rotatably disposed on the support axis. When the rotation base is rotated, the primary generator is driven to generate electric power. The plural rotation stand sets may define a rotation plane. A first end of each rotation stand set is fixedly disposed on the rotation base. Each blade is pivotally coupled to a second end of the corresponding rotation stand set through the corresponding deflection structure, so that an angle of attack of the blade in an airflow is correspondingly adjusted. When one of the plural blades is deflected, the corresponding deflection-limiting structure generates a first rotational torque in a first rotating direction or a second rotational torque in a second rotating direction so as to rotate the rotation base.

In accordance with another aspect of the present invention, there is provided a vertical axis wind turbine. The vertical axis wind turbine includes a support axis, a primary generator, and a wind wheel. The wind wheel includes a rotation base, plural rotation stand sets, plural blades corresponding to the plural rotation stand sets, plural pressure withstanding assemblies corresponding to the plural blades, and plural tension withstanding assemblies corresponding to the plural blades. The rotation base is rotatably disposed on the support axis. When the rotation base is rotated, the primary generator is driven to generate electric power. The plural rotation stand sets may define a rotation plane. A first end of each rotation stand set is fixedly disposed on the rotation base. Each blade is fixedly disposed to a second end of the corresponding rotation stand set. A first end of each pressure withstanding assembly is fixedly disposed on the rotation base. A second end of each pressure withstanding assembly is contacted with an inner surface of the corresponding blade but is not fixedly connected with the corresponding blade. When the corresponding pressure withstanding assembly is pushed by the inner surface of the corresponding blade, the corresponding pressure withstanding assembly generates a first rotational torque in a first rotating direction so as to rotate the rotation base. A first end of each tension withstanding assembly is fixedly disposed on the rotation base. A second end of each tension withstanding assembly is fixedly disposed on an inner surface of the corresponding blade. When the corresponding tension withstanding assembly is pulled by the inner surface of the corresponding blade, the corresponding tension withstanding assembly generates a second rotational torque in a second rotating direction so as to rotate the rotation base.

In accordance with another aspect of the present invention, there is provided a vertical axis wind turbine. The vertical axis wind turbine includes a support axis, a primary generator, and a wind wheel. The wind wheel includes a rotation base, plural rotation stand sets, plural deflection structures and plural blades corresponding to the plural rotation stand sets, plural pressure withstanding assemblies corresponding to the plural blades, and plural tension withstanding assemblies corresponding to the plural blades. The rotation base is rotatably disposed on the support axis. When the rotation base is rotated, the primary generator is driven to generate electric power. The plural rotation stand sets may define a rotation plane. A first end of each rotation stand set is fixedly disposed on the rotation base. Each blade is pivotally coupled to a second end of the corresponding rotation stand set through the corresponding deflection structure, so that an angle of attack of the blade in an airflow is correspondingly adjusted. A first end of each pressure withstanding assembly is fixedly disposed on the rotation base. A second end of each pressure withstanding assembly is contacted with an inner surface of the corresponding blade but is not fixedly connected with the corresponding blade. When the corresponding blade is deflected in a first rotation direction, a first rotational torque is generated by the corresponding pressure withstanding assembly to rotate the rotation base. A first end of each tension withstanding assembly is fixedly disposed on the rotation base. A second end of each tension withstanding assembly is fixedly disposed on an inner surface of the corresponding blade. When the corresponding blade is deflected in a second rotation direction, a second rotational torque is generated by the corresponding tension withstanding assembly to rotate the rotation base.

In accordance with another aspect of the present invention, there is provided a vertical axis wind turbine. The vertical axis wind turbine includes a support axis, a primary generator, and a wind wheel. The wind wheel includes a rotation base, a rotation mechanism, plural automatically-deflectable blade assemblies, and plural deflection-limiting structures corresponding to the plural blades. The rotation base is rotatably disposed on the support axis. When the rotation base is rotated, the primary generator is driven to generate electric power. The rotation mechanism has a first structure end fixedly disposed on the rotation base. Each of the plural automatically-deflectable blade assemblies is pivotally coupled to a second structure end of the rotation mechanism. When one of the plural blades is deflected, a first rotational torque in a first rotating direction or a second rotational torque in a second rotating direction is generated by the corresponding deflection-limiting structure so as to rotate the rotation base. When the rotation base is rotated, a leading edge of the corresponding blade is moved along a tangential direction of a circular trajectory of the rotation mechanism.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 3A:
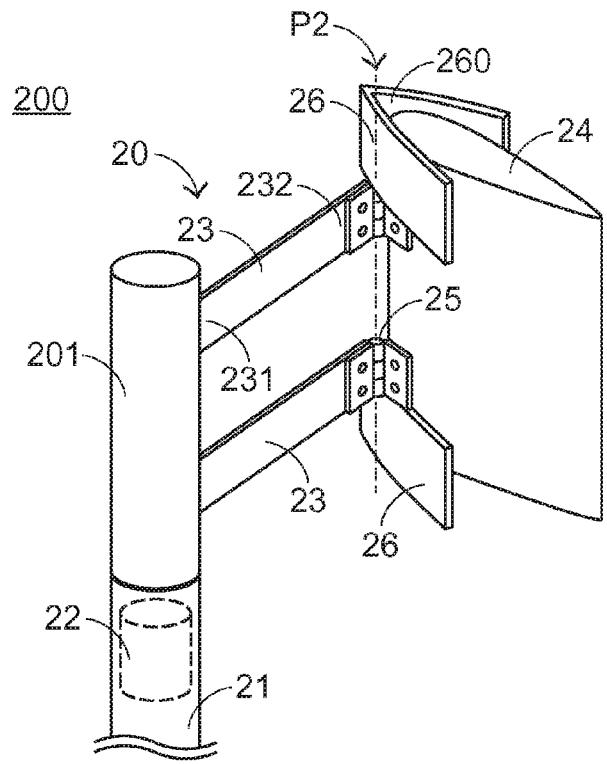
FIG. 3A is a schematic perspective view illustrating a vertical axis wind turbine according to a first embodiment of the present invention.

Hereinafter, a vertical axis wind turbine of a first embodiment of the present invention will be illustrated. FIG. 3A is a schematic perspective view illustrating a vertical axis wind turbine according to a first embodiment of the present invention. As shown in FIG. 3A, the vertical axis wind turbine 200 comprises a support axis 21, a primary generator 22, and a wind wheel 20. Through a rotation base 201 of the wind wheel 20, the wind wheel 20 is rotatably disposed on the support axis 21. That is, the support axis 21 not only supports the wind wheel 20 but also acts as a central axis of the wind wheel 20 upon rotation. In this embodiment, the primary generator 22 is also supported by the support axis 21, and the primary generator 22 is disposed within the support axis 21. As the rotation base 201 is rotated, the primary generator 22 is driven to generate electric power.

The wind wheel 20 further comprises a rotation mechanism and plural automatically-deflectable blade assemblies. For example, the rotation mechanism comprises plural rotation stand sets, and the plural automatically-deflectable blade assemblies comprise plural blades and plural deflection structures corresponding to the plural rotation stand sets. For clarification and brevity, only one rotation stand set 23 and a corresponding blade 24 are shown in FIG. 3A. It is noted that the numbers of the rotation stand sets 23 and the corresponding blades 24 may be varied according to the practical requirements. Generally, the wind turbine with vertical type (H-type) blades comprises at least two or three blades, but is not limited thereto. A first structure end of the rotation mechanism is fixedly disposed on the rotation base 201. In addition, all of the first ends of the plural rotation stand sets are collaboratively constituted as the first structure end, and fixedly disposed on the rotation base 201. As shown in FIG. 3A, the first end 231 of each rotation stand set 23 is fixedly disposed on the rotation base 201.

In this embodiment, all of the rotation stand sets 23 are rotated about the rotation base 201 to define a rotation plane. Moreover, each of the rotation stand sets 23 comprises two rotation stands. It is noted that the number of the rotation stands are not restricted. For example, in some other embodiments, each of the rotation stand sets 23 may comprise one or more than two rotation stands. Moreover, all of the rotation stand sets 23 are arranged along a normal direction of the rotation plane, and the support axis 21 is perpendicular to the ground or the direction of the airflow.

In accordance with a feature of this embodiment, each automatically-deflectable blade assembly is pivotally coupled to a second structure end of the rotation mechanism. In addition, all of the second ends of the plural rotation stand sets are collaboratively constituted as the second structure end, and the plural blade assemblies are pivotally coupled to the second structure end. As shown in FIG. 3A, the blade 24 is pivotally coupled to a second end 232 of the rotation stand set 23 through a deflection structure. That is, the blade 24 and the rotation stand sets 23 can be rotated about the support axis 21. In addition, the blade 24 is deflectable respective to the rotation stand sets 23. That is, the blade 24 is not fixedly disposed on the rotation stand sets 23. In this embodiment, the deflection structure is a hinge. A first part of the hinge 25 is fixedly disposed on the second end 232 of the rotation stand set 23 (i.e. a corresponding rotation stand). A second part of the hinge 25 is fixedly disposed on the blade 24. In addition, the hinge 25 is located at a leading edge of the blade 24 (i.e. the position of the fulcrum P2).

In accordance with another feature of the present invention, the wind wheel 20 further comprises plural deflection-limiting structures. Each of the plural deflection-limiting structures is disposed on the second end of the corresponding rotation stand set and aligned with the leading edge of the corresponding blade. Similarly, for clarification and brevity, only one deflection-limiting structure 26 is shown in FIG. 3A. Moreover, the deflection-limiting structure 26 has a recess 260 with a V-shaped cross section. An entrance of the recess 260 is aligned with the leading edge of the blade 24.

Although the deflection-limiting structure 26 is disposed on the second end 232 of the corresponding rotation stand set 23, the deflection-limiting structure 26 is not fixedly connected with the blade 24. In case that the blade 24 is deflected at a smaller deflection angle, the blade 24 is still not contacted with the deflection-limiting structure 26. However, in case that the blade 24 is deflected at a larger deflection angle, the blade 24 is possibly contacted with the deflection-limiting structure 26. Consequently, the blade 24 is permitted to be deflected at an angle within the range defined by the recess 260. In particular, the deflection-limiting structure 26 is designed to limit the deflectable extent of the blade 24. That is, the ranged defined by the V-shaped recess 260 denotes the deflectable range of the blade 24. It is noted that the recess 260 may be designed to have another profile. For example, in some other embodiments, the recess 260 is a horizontal flat plate with an arc slot on the plate. The blade is permitted to deflect in the extent of the arc slot.

Figure 3B:
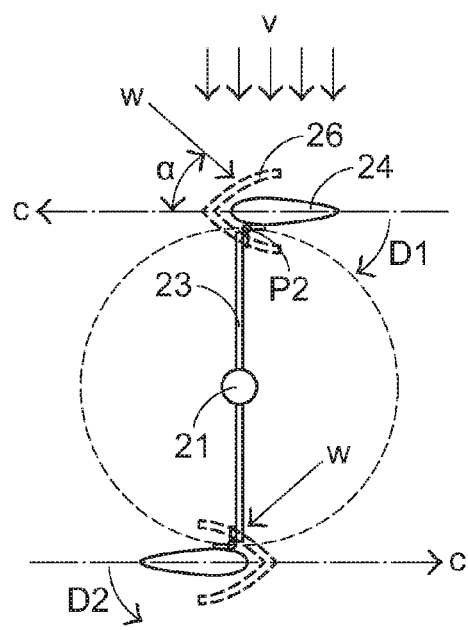
FIG. 3B schematically illustrates associated forces exerted on the blade of the vertical axis wind turbine of FIG. 3A.

FIG. 3B schematically illustrates associated forces exerted on the blade of the vertical axis wind turbine of FIG. 3A. As shown in FIG. 3A, a relative wind speed w is a wind speed relative to the blade 24 in an ambient wind speed v of an ambient wind field (i.e. in the direction of the airflow). Since the leading edge of the blade 24 is connected with the corresponding rotation stand set 23, the blade 24 is rotated along a tangential direction of the circular trajectory of the fulcrum P2 when the blade 24 is in a circular motion. Consequently, the pitch angle does not exist, or the pitch angle is effectively reduced.

As previously described in the prior art technology, if the pitch angle is effectively reduced, the influence of the angle of attack on the lift force will be reduced. As shown in FIG. 3B, the angle of attack ($\alpha$) between the relative wind speed w and the chord line c of the blade 24 is one of the factors influencing the lift force. Moreover, since the blade 24 is deflectable relative to the rotation stand set 23, even if the blade is rotated to different azimuth angles, the angle of attack ($\alpha$) of the blade 24 may be correspondingly adjusted according to the direction of the airflow or the relative wind speed w. Consequently, the blade 24 can be adjusted to have an angle of attack that will generate higher lift and lower drag forces. Due to the improved angle of attack, a higher lift force is acquired to generate the rotational torque.

Since the deflection-limiting structure 26 is designed to limit the deflectable extent of the blade 24, the negative effect of deflecting the blade 24 will be avoided. Moreover, when the blade 24 is deflected to be contacted with the deflection-limiting structure 26, a pushing force or a pulling force is generated. In response to the pushing force or a pulling force, a first rotational torque in a first rotating direction D1 or a second rotational torque in a second rotating direction D2 is generated to result in rotation of the rotation base 201. As shown in FIG. 3B, the first rotating direction D1 is a clockwise direction, and the second rotating direction D2 is an counter-clockwise direction. In particular, the first rotational torque is generated when the blade 24 is deflected in the first rotating direction D1 to push the deflection-limiting structure 26; and the second rotational torque is generated when the blade 24 is deflected in the second rotating direction D2 to pull the deflection-limiting structure 26. Note that the first rotating direction D1 is clockwise relative to the hinge P2 25, however, the pushing force acted on the deflection-limiting structure will generate a counter-clockwise rotation relative to the support axis 21. Therefore, for the action of both pushing and pulling forces, counter-clockwise rotation relative to the support axis 21 is generated. The efficiency of power generation is thus improved.

From the above discussions about the vertical axis wind turbine of the first embodiment, the blade is deflectable to increase the rotating efficiency. That is, during rotation of the blade, the angle of attack of the blade in the airflow is correspondingly adjusted. Consequently, the tangential component of the lift force is increased when compared with the conventional wind turbine. Moreover, when the blade is deflected to be contacted with the deflection-limiting structure, a pushing force or a pulling force is generated. That is, since a corresponding rotational torque is effectively generated according to the azimuth angle of the blade, the rotation base is correspondingly rotated. When the blade is rotated to a different azimuth angle, a pressure or a tension is correspondingly generated in response to the lift force. By means of the special design of the vertical axis wind turbine 200, the pressure or the tension can be transformed into a rotational torque. Consequently, the profile of the deflection-limiting structure may directly influence the overall rotating efficiency. The above V-shaped recess or the arc slot flat plate is presented herein for purpose of illustration and description only. It is noted that numerous modifications and alterations of the deflection-limiting structure may be made while retaining the teachings of the above concepts.

Figure 4:
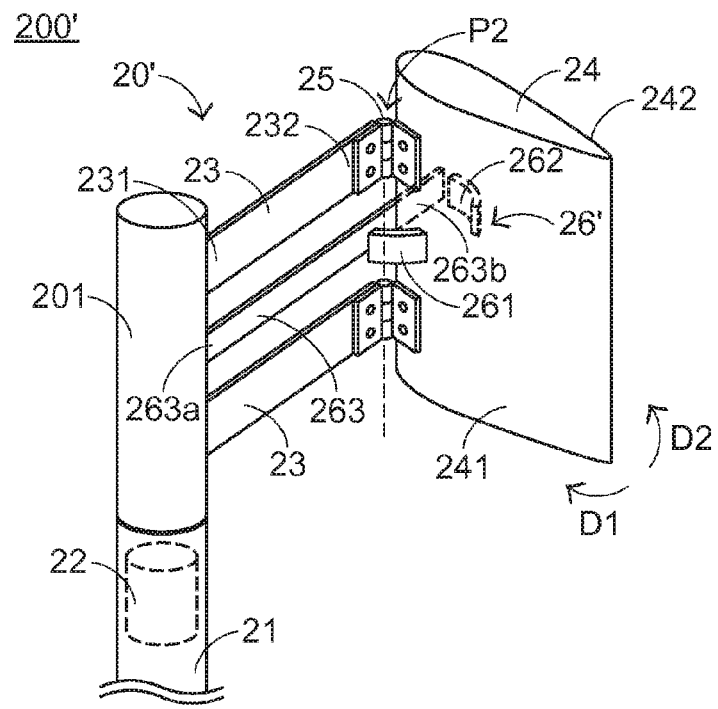
FIG. 4 is a schematic perspective view illustrating a vertical axis wind turbine according to a second embodiment of the present invention.

Hereinafter, a vertical axis wind turbine of a second embodiment of the present invention will be illustrated. FIG. 4 is a schematic perspective view illustrating a vertical axis wind turbine according to a second embodiment of the present invention. In comparison with the first embodiment, the deflection-limiting structure 26' of the vertical axis wind turbine 200' comprises a rod part 263, a first stopping part 261 and a second stopping part 262. A first end 263a of the rod part 263 is fixedly disposed on the rotation base 201. In addition, the first stopping part 261 and the second stopping part 262 have arc-shaped profiles. The first stopping part 261 and the second stopping part 262 are fixedly disposed on an inner surface 241 and an outer surface 242 of the blade 24, respectively. When the blade 24 is deflected in the first rotating direction D1, the first stopping part 261 may press the rod part 263 to generate the first rotational torque. When the blade 24 is deflected in the second rotating direction D2, the second stopping part 262 may press the rod part 263 to generate the second rotational torque.

In this embodiment, the rod part 263 of the deflection-limiting structure 26' is located at the leading edge of the blade 24. In particular, a second end 263b of the rod part 263 is located at the leading edge of the blade 24. However, the first stopping part 261 and the second stopping part 262 are not fixedly connected with the second end 263b of the rod part 263. That is, the second end 263b of the rod part 263 is a free end, and the second end 263b of the rod part 263 is separated from each of the first stopping part 261 and the second stopping part 262 by a gap. In case that the blade 24 is deflected at a smaller deflection angle, the first stopping part 261 or the second stopping part 262 is still not contacted with the second end 263b of the rod part 263. However, in case that the blade 24 is deflected at a larger deflection angle, the first stopping part 261 or the second stopping part 262 is possibly contacted with the second end 263b of the rod part 263. Consequently, the blade 24 is permitted to be deflected at an angle within the range defined by the first stopping part 261 and the second stopping part 262. In particular, the deflection-limiting structure 26' is designed to generate the toque by the rod part 263 rather than the rotation stand set 23. Consequently, the rotating efficiency is further enhanced.

From the above discussions about the vertical axis wind turbine of the first embodiment and the second embodiment, the deflection structure is located at the leading edge of the blade in order to achieve the optimal angle of attack in the airflow during rotation of the blade. In addition to the leading edge of the blade, the deflection structure may be located at other positions of the blade, so that the blade is deflectable.

Figure 5:
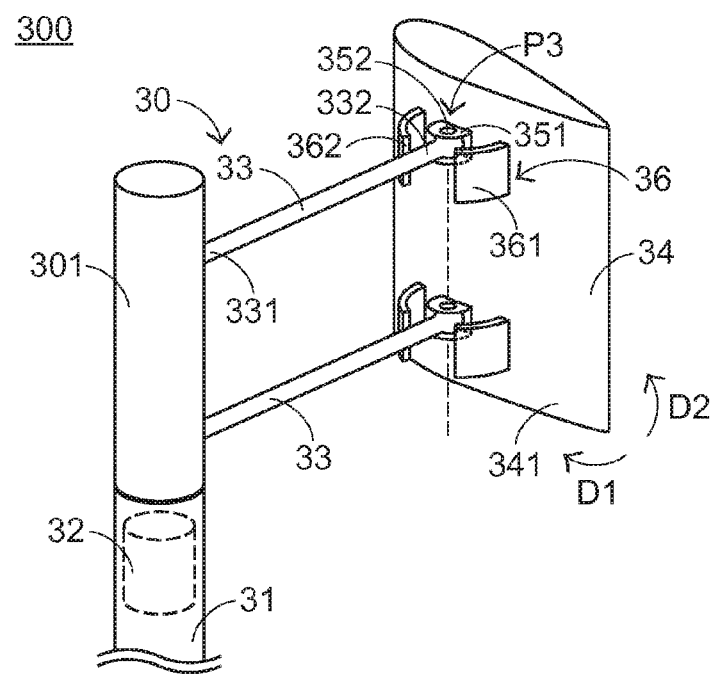
FIG. 5 is a schematic perspective view illustrating a vertical axis wind turbine according to a third embodiment of the present invention.

Hereinafter, a vertical axis wind turbine of a third embodiment of the present invention will be illustrated. FIG. 5 is a schematic perspective view illustrating a vertical axis wind turbine according to a third embodiment of the present invention. The vertical axis wind turbine 300 of this embodiment is modified by referring the teachings of the first embodiment and the second embodiment. Consequently, the similar structures are employed to achieve the similar functions or objects. Component parts and elements corresponding to those of the first embodiment and the second embodiment are designated by identical numeral references, and detailed description thereof is omitted. As shown in FIG. 5, a wind wheel 30 of the wind turbine 300 is rotatably disposed on a support axis 31 through a rotation base 301. In this embodiment, the deflection structure for allowing the blade to be deflected relative to the corresponding rotation stand set is not located at the leading edge of the blade. That is, the deflection structure is disposed on an inner surface of the blade, and separated from the leading edge of the blade by a specified distance.

Similarly, for clarification and brevity, only one rotation stand set 33 and the corresponding blade 34 are shown in FIG. 5. As shown in FIG. 5, the deflection structure comprises a deflection seat 351 and a deflection shaft 352. The deflection seat 351 is disposed on the blade 34. Especially, the deflection seat 351 is disposed on an inner surface 341 of the blade 34, and the deflection shaft 352 is disposed on the deflection seat 351. Moreover, after a second end 332 of the rotation stand set 33 is assembled with the deflection shaft 352, the second end 332 of the rotation stand set 33 is deflectable relative to the deflection shaft 352. For example, the second end 332 of the rotation stand set 33 may have an opening (not shown) with a shape matching the deflection shaft 352. After the deflection shaft 352 is inserted into the opening, the second end 332 of the rotation stand set 33 is assembled with the deflection shaft 35. The installation positions of the deflection seat 351 and the deflection shaft 352 are separated from the leading edge of the blade 34 by a specified distance. As shown in FIG. 5, the deflection seat 351 and the deflection shaft 352 are located at the fulcrum P3. In this embodiment, the specified distance is in the range between one fourth of a chord length of the blade 34 and one third of the chord length of the blade 34.

Moreover, for effectively avoiding the negative effect of deflecting the blade and generating the rotational torque, a deflection-limiting structure 36 of the wind turbine 300 of this embodiment comprises a first stopping part 361 and a second stopping part 362. The first stopping part 361 and the second stopping part 362 have arc-shaped profiles. Both of the first stopping part 361 and the second stopping part 362 are fixedly disposed on the inner surface 341 of the blade 34. In particular, the first stopping part 361 is located at a first side of the rotation stand set 33, and the second stopping part 362 is located at a second side of the rotation stand set 33. When the blade 34 is deflected in the first rotating direction D1, the first stopping part 361 may press the rotation stand set 33 to generate the first rotational torque. When the blade 34 is deflected in the second rotating direction D2, the second stopping part 362 may press the rotation stand set 33 to generate the second rotational torque.

From the above discussions about the vertical axis wind turbine of the third embodiment, the rotational torque is generated by the rotation stand set 33. According to the similar concepts, the deflection-limiting structure may have diversified configurations. For example, the first stopping part 361 and the second stopping part 362 may be directly disposed on the deflection seat 351. Alternatively, the deflection-limiting structure 26 of the first embodiment may be integrated into the wind turbine 300. That is, the V-shaped (or arc slot) deflection-limiting structure may be disposed on the second end 332 of the rotation stand set 33, and located at the leading edge of the blade 34. In this embodiment, the deflection structure is disposed on the inner surface 341 of the blade 34. It is noted that numerous modifications and alterations of the deflection structure may be made while retaining the teachings of the above concepts. For example, in some other embodiments, the blade has a hole, and a deflection shaft is disposed within the hole. After the second end of the rotation stand set is penetrated through the hole, the rotation stand set is assembled with the blade. Under this circumstance, the two stopping parts of the deflection-limiting structure are disposed on the second end of the rotation stand set, and disposed on the inner surface and the outer surface of the blade, respectively.

From the above discussions about the vertical axis wind turbine of the third embodiment, since the blade is deflectable, the angle of attack of the blade in the airflow is correspondingly adjusted during rotation of the blade. When compared with the conventional wind turbine, the tangential component of the lift force of the present wind turbine is increased, and thus the rotating efficiency is enhanced. However, as previously described in the prior art, since the fulcrum P3 is separated from the leading edge of the blade by a specified distance, a pitch angle is correspondingly generated. That is, the change of the angle of attack is correspondingly influenced.

Figure 6A:
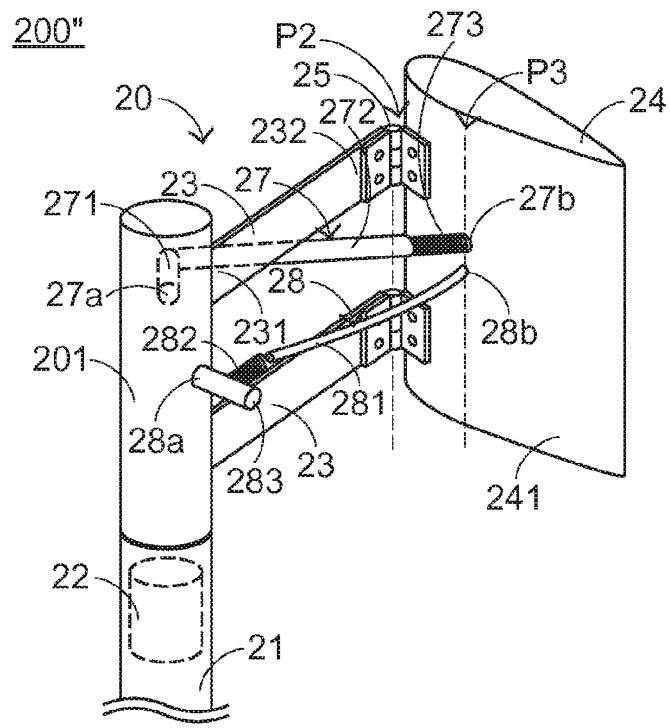
FIG. 6A is a schematic perspective view illustrating a vertical axis wind turbine according to a fourth embodiment of the present invention.
Figure 6B:
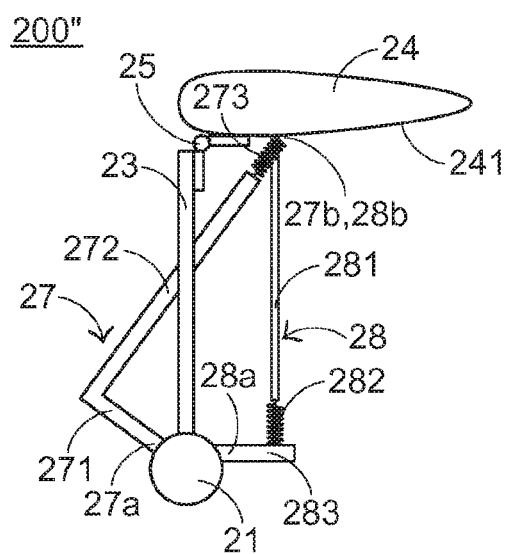
FIG. 6B is a schematic planar view illustrating the vertical axis wind turbine of FIG. 6A.

Hereinafter, a vertical axis wind turbine of a fourth embodiment of the present invention will be illustrated. FIG. 6A is a schematic perspective view illustrating a vertical axis wind turbine according to a fourth embodiment of the present invention. FIG. 6B is a schematic planar view illustrating the vertical axis wind turbine of FIG. 6A. The vertical axis wind turbine 200" of this embodiment is modified by referring the teachings of the first embodiment and the second embodiment. Consequently, the similar structures are employed to achieve the similar functions or objects. Component parts and elements corresponding to those of the first embodiment and the second embodiment are designated by identical numeral references, and detailed description thereof is omitted. In this embodiment, the blade is deflectable relative to the corresponding rotation stand set. Moreover, the wind turbine 200" further comprises plural pressure withstanding assemblies and plural tension withstanding assemblies.

For clarification and brevity, only one pressure withstanding assembly 27 and only one tension withstanding assembly 28 are shown in FIGS. 6A and 6B. A first end 27a of the pressure withstanding assembly 27 is fixedly disposed on the rotation base 201. A second end 27b of the pressure withstanding assembly 27 is not fixedly connected with the blade 24, but is contacted with an inner surface 241 of the blade 24. That is, the second end 27b of the pressure withstanding assembly 27 is a free end. On the other hand, a first end 28a of the tension withstanding assembly 28 is fixedly disposed on the rotation base 201. A second end 28b of the tension withstanding assembly 28 is fixedly disposed on the inner surface 241 of the blade 24.

The pressure withstanding assembly 27 is used for withstanding the pressure (i.e. a pushing force) that is caused by the lift force (or the component in the normal direction) at the windward side and generate a counter-clockwise rotation around the support axis 21 (i.e. the central axis). On the other hand, the tension withstanding assembly 28 is used for withstanding the tension (i.e. a pulling force) that is caused by the lift force (or the component in the normal direction) at the leeward side and generate a counter-clockwise rotation around the support axis 21 (i.e. the central axis). The structures and operations of the pressure withstanding assembly 27 and the tension withstanding assembly 28 will be illustrated in more details as follows.

Please refer to FIGS. 6A and 6B again. In this embodiment, the pressure withstanding assembly 27 principle comprises a first bar 271 and a second bar 272. The first bar 271 and the second bar 272 are perpendicular to each other and connected with each other. The first bar 271 is partially or completely served as the first end 27a of the pressure withstanding assembly 27. The first bar 271 and the second bar 272 are not contacted with the rotation stand set 23. In particular, the first bar 271 and the second bar 272 may be disposed within a space between the two rotation stands of the rotation stand set 23. In addition, the first bar 271 and the second bar 272 are used for producing an optimal rotational torque. The first bar 271 and the second bar 272 are in parallel with the rotation plane. There is an angle between the first bar 271 and the rotation stand set 23 on the rotation plane.

In this embodiment, the pressure withstanding assembly 27 further comprises a spring 273. The spring 273 is connected with the second bar 272, and served as the second end 27b of the pressure withstanding assembly 27. The spring 273 is not connected with the inner surface 241 of the blade 24, but the spring 273 is only contacted with and sustained against the inner surface 241 of the blade 24. In particular, the contacting point between the spring 273 and the inner surface 241 of the blade 24 is separated from the leading edge of the blade 24 by a specified distance. That is, the contacting point is at the fulcrum P3. In this embodiment, the specified distance is in the range between one fourth of a chord length of the blade 24 and one third of the chord length of the blade 24.

Figure 1:
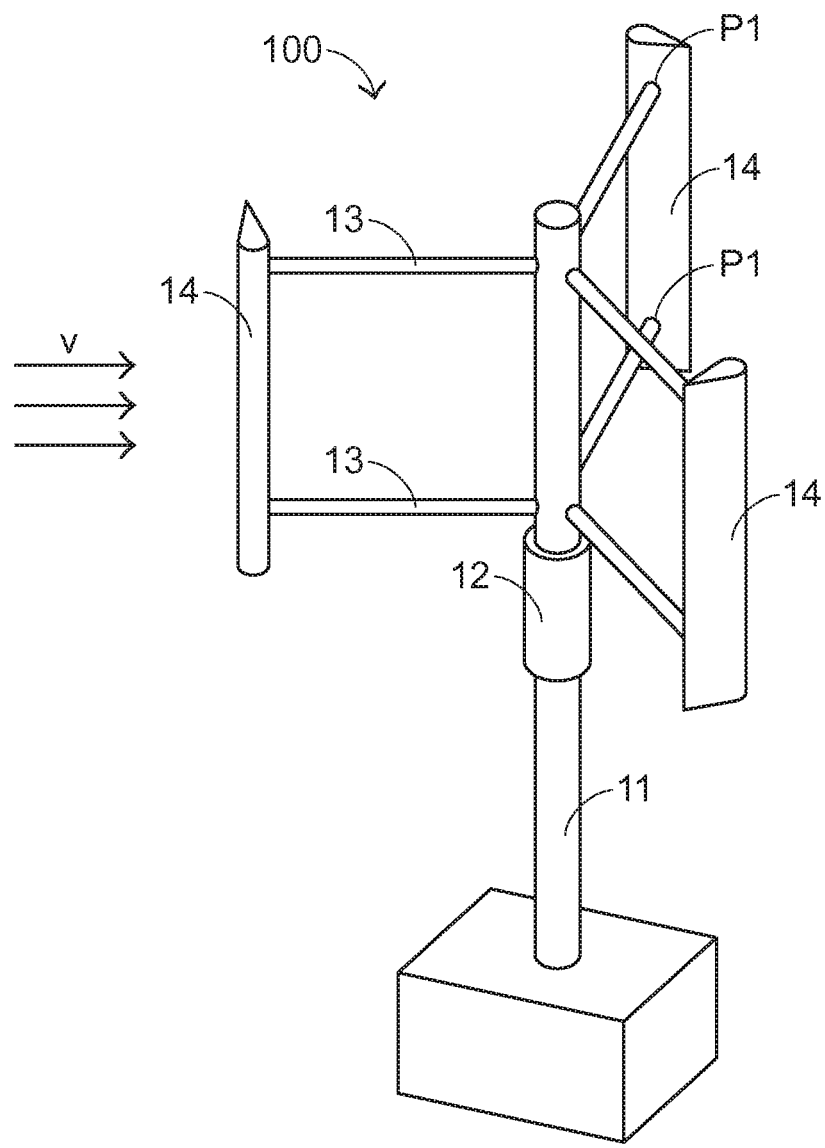
FIG. 1 is a schematic perspective view illustrating a conventional vertical axis wind turbine.
Figure 2A:
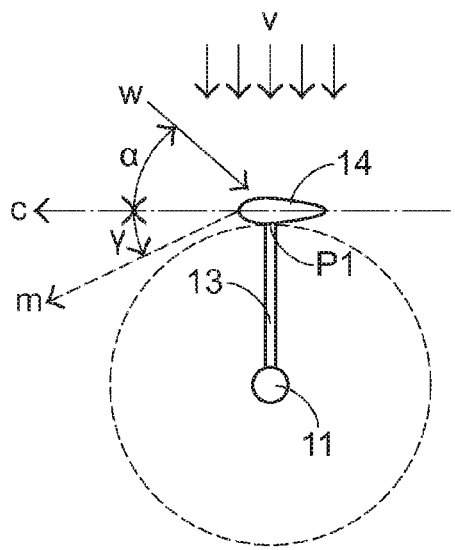
FIGS. 2A and 2B schematically illustrate two-dimensional expression of associated forces exerted on the blade of the vertical axis wind turbine of FIG. 1.
Figure 2B:
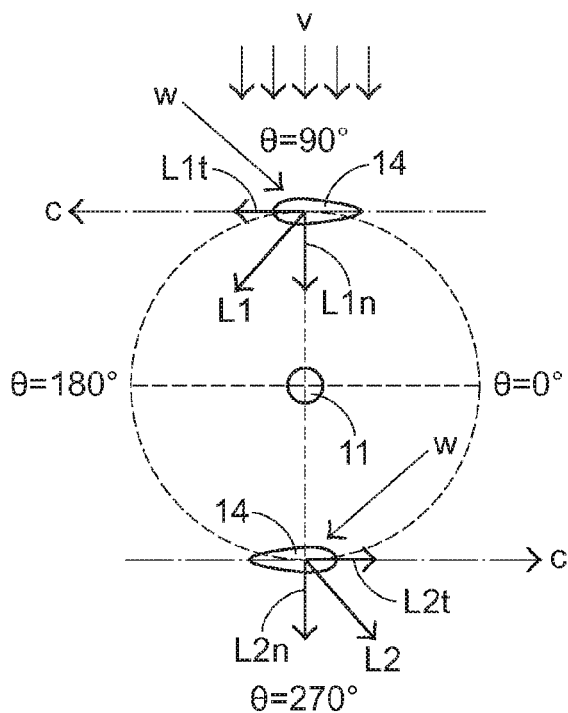
Figure 6C:
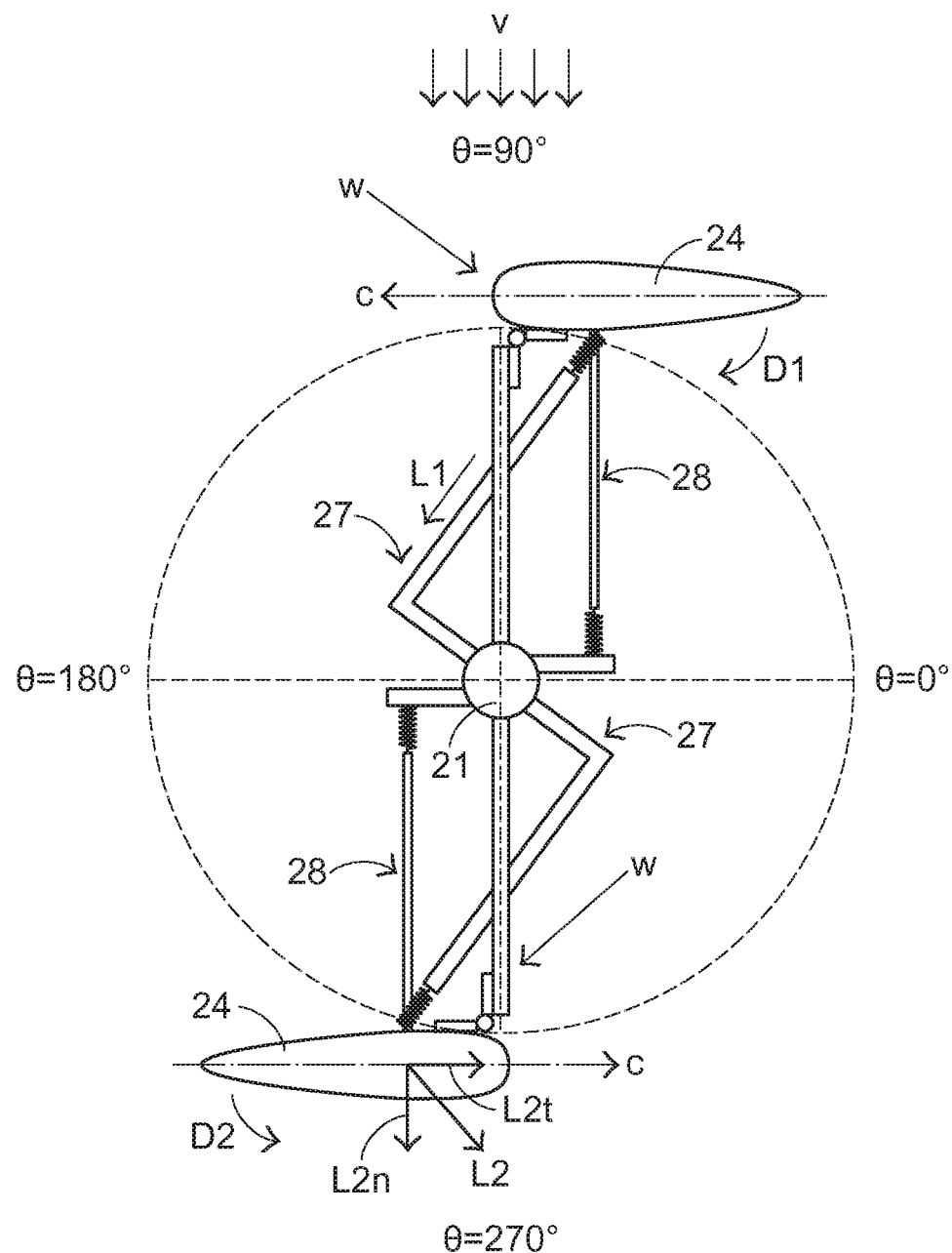
FIG. 6C schematically illustrates associated forces exerted on the blade of the vertical axis wind turbine of FIG. 6A.

FIG. 6C schematically illustrates associated forces exerted on the blade of the vertical axis wind turbine of FIG. 6A. The definitions of some components are similar to those of FIGS. 2B and 3B, and are not redundantly described herein. As shown in FIG. 6C, when the blade 24 is rotated to the position corresponding to the azimuth angle θ of 90 degrees, the generated lift force L1 is in the direction toward the pressure withstanding assembly 27 and exerted on the pressure withstanding assembly 27. That is, the lift force L1 is in parallel with the second bar 272, and perpendicular to the first bar 271. Under this circumstance, the lift force L1 exerts a pressure on the pressure withstanding assembly 27 directly. In response to the pressure, the pressure withstanding assembly 27 generates a rotational torque to rotate the rotation base 201. In this embodiment, the rotational torque generated by the pressure withstanding assembly 27 is defined as the first rotational torque. That is, when the blade 24 is deflected in the first rotating direction D1 to push the pressure withstanding assembly 27, the first rotational torque is generated to rotate the rotation base 201.

As mentioned above, when the blade 24 is rotated to the position corresponding to the azimuth angle at the windward side, the blade 24 has the tendency of being deflected toward the support axis 21. In addition, a pressure is exerted on the second end 27b of the pressure withstanding assembly 27 (i.e. the spring 273) by the inner surface 241 of the blade 24. This pressure is caused by the component of the lift force in the normal direction. Similarly, in response to the pressure, the rotational torque is generated by the pressure withstanding assembly 27 to rotate the rotation base 201.

Moreover, when the blade 24 is rotated and the pressure is exerted on the spring 273 by the inner surface 241 of the blade 24, in response to the elasticity of the spring 273, the blade 24 receives a restoring force. The restoring force is in the direction reverse to the force that deflects the blade 24. In response to the restoring force, the blade 24 is restored to its original state. For example, after the blade 24 is completely restored, the chord line c of the blade 24 is perpendicular to the rotation stand set 23.

Consequently, due to the arrangement of the pressure withstanding assembly 27, the pressure that is caused by the lift force (or the component in the normal direction) at the windward side can be transformed into the rotational torque. Under this circumstance, the possibility of causing damage of the support axis 21 is effectively reduced or eliminated since the lift component in the normal direction is not acted on the support axis 21 (i.e the central axis). Moreover, when the blade is rotated to any position corresponding to the azimuth angle at the windward side, the tangential component of the generated lift force can still effectively generate the rotational torque, which is similar to the prior art technology. Consequently, the rotating efficiency is further enhanced. However, since the pressure is exerted on the pressure withstanding assembly 27 along the normal direction toward the support axis 21, no acting force is exerted on the tension withstanding assembly 28 by the pressure. The reason will be described later.

In the embodiment, the pressure withstanding assembly 27 comprises the two bars 271, 272 and the spring 273. Alternatively, in some other embodiments, the pressure withstanding assembly may comprise more than two bars, or the shapes of the bars and the connecting relationships between these bars may be modified according to the practical requirements. In this embodiment, the spring 273 is used for restoring the blade 24 to its original state and preventing the direct contact between the blade 24 and the second bar 272. More especially, the spring 273 can generate the rotational torque in response to the pushing action of the pressure. Alternatively, in some other embodiments, the spring 273 may be replaced by any other element which is made of the similar material of the spring 273. Alternatively, in some other embodiments, the spring 273 may be omitted, but the tip of the second bar 272 is directly served as the second end 27b of the pressure withstanding assembly 27.

Please refer to FIGS. 6A and 6B again. In this embodiment, the tension withstanding assembly 28 principally comprises a rope 281 and a third bar 283. The rope 281 is indirectly connected with the third bar 283. The third bar 283 is partially or completely served as the first end 28a of the tension withstanding assembly 28. Similarly, the rope 281 and the third bar 283 are not contacted with the rotation stand set 23 or the pressure withstanding assembly 27. In particular, the rope 281 and the third bar 283 may be disposed within a space between the two rotation stands of the rotation stand set 23. In addition, the rope 281 and the third bar 283 are used for producing an optimal rotational torque. In response to a tension, the rope 281 is stretched to be straight. Under this circumstance, the rope 281 is perpendicular to the third bar 283, and the rope 281 and the third bar 283 are in parallel with the rotation plane. Moreover, on the rotation plane, the third bar 283 is perpendicular to the rotation stand set 23.

In this embodiment, the tension withstanding assembly 28 further comprises a spring 282. The spring 282 is connected between the rope 281 and the third bar 283. The tip of the rope 281 is served as the second end 28b of the tension withstanding assembly 28, and connected with the inner surface 241 of the blade 24 directly. In particular, the contacting point between the rope 281 and the inner surface 241 of the blade 24 is separated from the leading edge of the blade 24 by a specified distance. That is, the contacting point is at the fulcrum P3. In this embodiment, the specified distance is in the range between one fourth of a chord length of the blade 24 and one third of the chord length of the blade 24.

Please refer to FIG. 6C again. When the blade 24 is rotated to the position corresponding to the azimuth angle θ of 270 degrees or any other azimuth angle θ at the leeward side, the blade 24 has the tendency to be deflected in the direction away from the support axis 21. In addition, a tension is exerted on the second end 28b of the tension withstanding assembly 28 (i.e. the tip of the rope 281) by the inner surface 241 of the blade 24. This tension is caused by the component L2n of the lift force L2 in the normal direction and at the corresponding azimuth angle. In response to the tension, the tension withstanding assembly 28 generates a rotational torque to rotate the rotation base 201. In this embodiment, the rotational torque generated by the tension withstanding assembly 28 is defined as the second rotational torque. That is, when the blade 24 is deflected in the second rotating direction D2 to pull the tension withstanding assembly 28, the second rotational torque is generated to rotate the rotation base 201.

Moreover, when the blade 24 is rotated and the tension is exerted on the spring 282 and the rope 281 by the inner surface 241 of the blade 24, in response to the elasticity of the spring 282 and the tenacity of the rope 281, the blade 24 is restored to its original state. For example, after the blade 24 is completely restored, the chord line c of the blade 24 is perpendicular to the rotation stand set 23.

Moreover, when the blade 24 is rotated to any position corresponding to the azimuth angle at the leeward side, the generated lift force L2 is in the direction along the tension withstanding assembly 28 and exerted on the tension withstanding assembly 28. That is, the lift force L2 is in parallel with the rope 281 and perpendicular to the third bar 283. Meanwhile, in response to the lift force L2, the tension is exerted on the tension withstanding assembly 28. In response to the tension, the tension withstanding assembly 28 generates the rotational torque to rotate the rotation base 201.

Similarly, due to the arrangement of the tension withstanding assembly 28, the tension that is caused by the lift force (or the component in the normal direction) at the leeward side can be transformed into the rotational torque. Under this circumstance, the possibility of causing damage of the support axis 21 is effectively reduced or eliminated since the lift component in the normal direction is not acted on the support axis 21 (i.e the central axis). Moreover, when the blade is rotated to any position corresponding to the azimuth angle at the leeward side, the tangential component of the generated lift force can still effectively generate the rotational torque, which is similar to the prior art technology. Consequently, the rotating efficiency is further enhanced. However, since the tension is exerted on the tension withstanding assembly 28 along the normal direction away from the support axis 21, no acting force is exerted on the pressure withstanding assembly 27 by the tension.

In the embodiment, spring 282 is connected between the rope 281 and the third bar 283. Alternatively, in some other embodiments, the spring 282 may be connected between the rope 281 and the inner surface 241 of the blade 24. That is, the spring 282 is served as the second end 28b of the tension withstanding assembly 28 while achieving the similar efficacy. In this embodiment, the spring 282 is used for restoring the blade 24 to its original state. More especially, the spring 282 can generate the rotational torque in response to the pulling action of the tension. Alternatively, in some other embodiments, the spring 282 may be replaced by any other element which is made of the similar material of the spring 282. Alternatively, in some other embodiments, the spring 282 may be omitted, but only the rope 281 and the third bar 283 are retained and connected with each other.

From the above discussions about the vertical axis wind turbine of the fourth embodiment, the blade can be restored to its original state by associated elements. That is, the deflectable extent of the blade can be limited. Under this circumstance, the desired rotational torque can be effectively generated without the need of using the deflection-limiting structure. Alternatively, depending on the conditions of the applied environments, a corresponding deflection-limiting structure may be integrated into the wind turbine 200" of the fourth embodiment. Moreover, as mentioned above, the blade of the wind turbine 200" of the fourth embodiment is deflectable.

Figure 7:
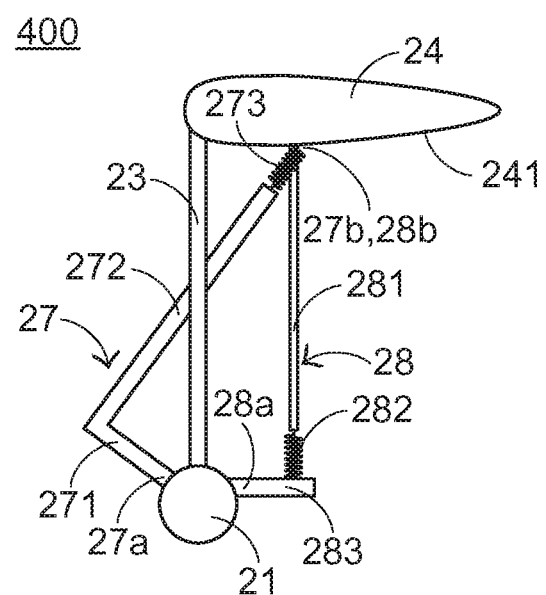
FIG. 7 is a schematic planar view illustrating a vertical axis wind turbine according to a fifth embodiment of the present invention.

Hereinafter, a vertical axis wind turbine of a fifth embodiment of the present invention will be illustrated. FIG. 7 is a schematic planar view illustrating a vertical axis wind turbine according to a fifth embodiment of the present invention. In comparison with the fourth embodiment, the vertical axis wind turbine 400 of this embodiment is not equipped with a deflection structure. That is, the second end of the rotation stand set 23 is fixedly disposed on the leading edge of the blade 24. The pressure withstanding assembly, the tension is exerted on the tension withstanding assembly, the rotation base and the rotation stand set of the vertical axis wind turbine 400 are identical to those of the fourth embodiment, and are not redundantly described herein. In particular, even if the blade 24 is not deflectable, the pressure is exerted on the pressure withstanding assembly 27 or the tension is exerted on the tension withstanding assembly 28. That is, the pushing force or the pulling force is generated by the inner surface 241 of the blade 24. By means of the pressure withstanding assembly 27 or the tension withstanding assembly 28, the pressure or the tension can be effectively transformed into the first rotational torque or the second rotational torque. In addition, the pressure withstanding assembly 27 or the tension withstanding assembly 28 can reduce the acting force exerted on the rotation stand set 23 and the support axis 21, the possibility of damaging the rotation stand set 23 or the support axis 21 will be minimized.

Moreover, both of the first rotational torque and the second rotational torque are in the same direction as the rotational torque in the tangential direction. In other words, by the wind turbine of each of the above embodiments, the rotational torque generated by the pressure, the tension or the normal component or the tangential component of the lift force can increase the rotating capability of the blade or the wind wheel in the same direction. Since the rotating effects are not offset by each other, the rotating efficiency is largely enhanced, and the power generation efficiency is increased.

From the above descriptions, the present invention provides a vertical axis wind turbine. In case that the blade is deflectable, the angle of attack of the blade in the airflow upon rotation of the blade can be correspondingly adjusted. Consequently, the component of the lift force in the tangential direction is correspondingly increased, and the rotating efficiency is enhanced. Moreover, due to the arrangements of the deflection-limiting structure, the pressure withstanding assembly and the tension withstanding assembly, the deflectable extent of the blade can be limited and the rotational torque can be effectively generated. These structures can withstand the pressure or the tension that is caused by the lift force and transform the pressure or the tension into the rotational torque in order to enhance the rotating efficiency and increase the power generation efficiency. Moreover, these structures can effectively reduce or eliminate the possibility of damaging the support axis (i.e. a central axis).

As a consequence, the vertical axis wind turbine of the present invention is effective to solve the problems encountered from the prior art technology and achieve industrial advance and development.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A vertical axis wind turbine, comprising:
    a support axis;
    a primary generator; and
    a wind wheel comprising:
        a rotation base rotatably disposed on the support axis, wherein when the rotation base is rotated, the primary generator is driven to generate electric power;
        plural rotation stand sets for defining a rotation plane, wherein a first end of each rotation stand set is fixedly disposed on the rotation base;
        plural deflection structures and plural blades corresponding to the plural rotation stand sets, wherein each blade is pivotally coupled to a second end of the corresponding rotation stand set through the corresponding deflection structure, so that an angle of attack of the blade in an airflow is correspondingly adjusted;
        plural pressure withstanding assemblies, wherein a first end of each pressure withstanding assembly is fixedly disposed on the rotation base, and a second end of each pressure withstanding assembly is contacted with an inner surface of the corresponding blade but is not fixedly connected with the corresponding blade; and
        plural deflection-limiting structures corresponding to the plural blades, wherein when one of the plural blades is deflected, the corresponding deflection-limiting structure generates a first rotational torque in a first rotating direction or a second rotational torque in a second rotating direction so as to rotate the rotation base.

2. The vertical axis wind turbine according to claim 1, wherein when one of the plural blades is deflected and a pressure is exerted on the second end of the corresponding pressure withstanding assembly by the inner surface of the blade, in response to the pressure, said first rotational torque is generated by the corresponding pressure withstanding assembly so as to rotate the rotation base.

3. The vertical axis wind turbine according to claim 1, wherein when one of the plural blades is deflected and a pressure is exerted on the second end of the corresponding pressure withstanding assembly by the inner surface of the blade, in response to the pressure, the blade is restored to an original state by the corresponding pressure withstanding assembly.

4. The vertical axis wind turbine according to claim 1, wherein each of the plural pressure withstanding assemblies comprises a first bar and a second bar, wherein the first bar and the second bar are perpendicular to each other and connected with each other, wherein the first bar and the second bar are in parallel with the rotation plane.

5. The vertical axis wind turbine according to claim 1, wherein each of the plural pressure withstanding assemblies comprises a spring, wherein the spring is served as the second end of the pressure withstanding assembly.

6. The vertical axis wind turbine according to claim 1, wherein the second end of each pressure withstanding assembly is separated from a leading edge of the corresponding blade by a specified distance, wherein the specified distance is in a range between one fourth of a chord length of the corresponding blade and one third of the chord length of the corresponding blade.

7. A vertical axis wind turbine, comprising:
    a support axis;
    a primary generator; and
    a wind wheel comprising:
        a rotation base rotatably disposed on the support axis, wherein when the rotation base is rotated, the primary generator is driven to generate electric power;
        plural rotation stand sets for defining a rotation plane, wherein a first end of each rotation stand set is fixedly disposed on the rotation base;
        plural deflection structures and plural blades corresponding to the plural rotation stand sets, wherein each blade is pivotally coupled to a second end of the corresponding rotation stand set through the corresponding deflection structure, so that an angle of attack of the blade in an airflow is correspondingly adjusted;
        plural tension withstanding assemblies, wherein a first end of each tension withstanding assembly is fixedly disposed on the rotation base, and a second end of each tension withstanding assembly is fixedly disposed on an inner surface of the corresponding blade; and
        plural deflection-limiting structures corresponding to the plural blades, wherein when one of the plural blades is deflected, the corresponding deflection-limiting structure generates a first rotational torque in a first rotating direction or a second rotational torque in a second rotating direction so as to rotate the rotation base.

8. The vertical axis wind turbine according to claim 7, wherein when one of the plural blades is deflected and a tension is exerted on the second end of the corresponding tension withstanding assembly by the inner surface of the blade, in response to the tension, said second rotational torque is generated by the corresponding tension withstanding assembly so as to rotate the rotation base.

9. The vertical axis wind turbine according to claim 7, wherein when one of the plural blades is deflected and a tension is exerted on the second end of the corresponding tension withstanding assembly by the inner surface of the blade, in response to the tension, the blade is restored to an original state by the corresponding tension withstanding assembly.

10. The vertical axis wind turbine according to claim 7, wherein each of the plural tension withstanding assemblies comprises a third bar and a rope, wherein the rope is connected with the third bar, wherein when the rope is stretched to be straight in response to a tension, the rope is perpendicular to the third bar, and the rope and the third bar are in parallel with the rotation plane.

11. The vertical axis wind turbine according to claim 10, wherein each of the plural tension withstanding assemblies further comprises a spring, wherein the spring is connected between the rope and the third bar, or the spring is served as the second end of the tension withstanding assembly.

12. The vertical axis wind turbine according to claim 7, wherein the second end of each tension withstanding assembly is separated from a leading edge of the corresponding blade by a specified distance, wherein the specified distance is in a range between one fourth of a chord length of the corresponding blade and one third of the chord length of the corresponding blade.

13. A vertical axis wind turbine, comprising:
a support axis;
a primary generator; and
a wind wheel comprising:
- a rotation base rotatably disposed on the support axis, wherein when the rotation base is rotated, the primary generator is driven to generate electric power;
- plural rotation stand sets for defining a rotation plane, wherein a first end of each rotation stand set is fixedly disposed on the rotation base;
- plural deflection structures and plural blades corresponding to the plural rotation stand sets, wherein each blade is pivotally coupled to a second end of the corresponding rotation stand set through the corresponding deflection structure, so that an angle of attack of the blade in an airflow is correspondingly adjusted;
- plural pressure withstanding assemblies corresponding to the plural blades, wherein a first end of each pressure withstanding assembly is fixedly disposed on the rotation base, and a second end of each pressure withstanding assembly is contacted with an inner surface of the corresponding blade but is not fixedly connected with the corresponding blade, wherein when the corresponding blade is deflected in a first rotation direction, a first rotational torque is generated by the corresponding pressure withstanding assembly to rotate the rotation base; and
- plural tension withstanding assemblies corresponding to the plural blades, wherein a first end of each tension withstanding assembly is fixedly disposed on the rotation base, and a second end of each tension withstanding assembly is fixedly disposed on an inner surface of the corresponding blade, wherein when the corresponding blade is deflected in a second rotation direction, a second rotational torque is generated by the corresponding tension withstanding assembly to rotate the rotation base.

* * * * *